United States Patent [19]

Rodrigues et al.

[11] Patent Number: 4,609,408

[45] Date of Patent: Sep. 2, 1986

[54] PROCESS FOR MANUFACTURING ALUMINUM THIN STRIP AND FOIL HAVING A LARGE FRACTION OF CUBE TEXTURE

[75] Inventors: Pedro Rodrigues, Schaffhausen; Heinz Bichsel, Neuhausen, both of Switzerland; Frank Wehner, Singen, Fed. Rep. of Germany

[73] Assignee: Swiss Aluminium Ltd., Chippis, Switzerland

[21] Appl. No.: 639,598

[22] Filed: Aug. 10, 1984

[30] Foreign Application Priority Data

Aug. 25, 1983 [CH] Switzerland ............... 4634/83

[51] Int. Cl.$^4$ ................................................ C22F 1/04
[52] U.S. Cl. .................................. 148/2; 148/11.5 A; 148/437
[58] Field of Search ............... 148/11.5 A, 2, 415, 148/437

[56] References Cited

U.S. PATENT DOCUMENTS 3,716,419 2/1973 Boutin ..................... 148/11.5 A

*Primary Examiner*—R. Dean
*Attorney, Agent, or Firm*—Bachman & LaPointe

[57] ABSTRACT

A process for manufacturing thin strip or foil of aluminum of at least 99.9% purity is such that, after casting, the cast material is rolled to final thickness at temperatures between 20° and 420° C., whereby at thicknesses below at least 8 times the final thickness no intermediate anneals are performed and rolling is carried out at temperatures no higher than 250° C. After a recrystallizing final anneal at temperatures between 480° and 640° C. the material exhibits mainly cube texture.

23 Claims, No Drawings

PROCESS FOR MANUFACTURING ALUMINUM THIN STRIP AND FOIL HAVING A LARGE FRACTION OF CUBE TEXTURE

BACKGROUND OF THE INVENTION

The invention relates to a process for manufacturing a thin strip or foil of aluminum which, after a recrystallizing final anneal, exhibits mainly cube texture.

In aluminum the so called cube orientation often occurs as a texture component after recrystallization has taken place. The fraction of cube texture greatly depends, however, on impurity or alloying elements, rolling and annealing procedures, and on the thickness of the thin strip or foil.

To achieve the maximum possible fraction of cube orientation in foils or strips thinner than 0.2 mm it has been proposed, after hot rolling, to cold roll the metal to a thickness of 1.05 to 1.35 times the final thickness, the thickness after hot rolling being at least 11 times this intermediate thickness. The metal is then to be annealed, at this intermediate thickness, at temperatures between 180° and 350° C. before cold rolling to final thickness. At final thickness a recrystallizing anneal is then carried out at temperatures between 300° and 650° C.

The amount of cube texture reported from this treatment is 45–95% for 99.993% aluminum and 70% for 99.96% aluminum. The essential point of this process that is, the small degree of cold reduction from the intermediate thickness to the final thickness, has the effect, however, of significantly increasing manufacturing costs.

The object of the present invention is therefore to develop a process for producing a larger fraction of cube texture in aluminum thin strip and foil such that the said process provides similar or even better results at lower expense.

SUMMARY OF THE INVENTION

The foregoing object is achieved by way of the present invention wherein aluminum of at least 99.9% purity, after casting, is rolled to final thickness at temperatures between 20 and 420° C., such that below thicknesses of at least 8 times the final thickness no intermediate anneals are carried out, rolling is performed at temperatures not exceeding 250° C., and the final anneal is performed at temperatures between 480° and 460° C.

DETAILED DESCRIPTION

The combination of low hot rolling temperatures and cold rolling without an intermediate anneal from at least 8 times the final thickness results, in aluminum containing at most 0.1% of other elements—in a very large fraction of cube texture after a recrystallizing final anneal at temperatures between 480 and 640° C. Essential in this case is that, on rolling from at least 8 times the final thickness, the strip must never reach too high a temperature that is must never exceed 250° C.

If the material is produced by continuous casting between rolls, then the hot rolling can be ommitted. It has been found advantageous to introduce a heat treatment after casting but before rolling, said treatment however, comprising not longer than 12 hours at a maximum temperature of 430° C.

A useful version of the process according to the invention comprises the use of a strip casting facility with moving caterpiller track type belts (for example of the ALUSUISSE CASTER II type) or belts (e.g. from a Hazelett type of caster). In this case the 12–25 mm thick cast strip is hot rolled at least at 200° C., but also such that here the temperature must not exceed 420° C.

The use of strip casters of the ALUSUISSE CASTER I type (roll caster) is eminently suitable for achieving the object of the present invention.

Trials have shown that the temperature of final anneal should usefully be limited to a range of 520°–600° C. and the duration of the anneal to ½ to 12 hours. Particularly large fractions of cube texture are obtained if the as-rolled strip at final thickness is not heated too quickly to the final anneal temperature. Heating rates of more than 500° K/h should be avoided.

Such large fractions of cube texture are obtained with even greater certainty if, after the final cold rolling and prior to the final anneal, a pre-anneal heat treatment is performed at temperatures between 120 and 300° C. The duration of the pre-anneal should then not exceed 30 hours.

Particularly useful is to employ a material of which at most 200 ppm is not aluminum.

Foils or, if desired thin strips, manufactured according to the invention are excellent materials for the preparation of anodes of electrolytic capacitors. A large fraction of cube texture is an important pre-requisite for superior formation of tunnels during high volt etching. Such a tunnel type of etching behavior increases the capacitance of electrolytic capacitors made out of such material, and this without excessively impairing the load bearing capacity of the foil.

Further advantages, features and details of the invention are revealed in the following description of preferred exemplified embodiments.

EXAMPLE NO 1

High purity aluminum containing 26 ppm Si, 20 ppm Fe, 35 ppm Cu and less than 10 ppm of other elements was cast into ingots by DC casting. After heating the ingots to 400° C. they were hot rolled with this same starting temperature to a thickness of 10 mm, during which the temperature fell fo 350° C.; directly after this the plate material was cooled in water.

Without any intermediate anneal the material was cold rolled down to 0.14 mm then, employing a heating rate of 60° C./h, heated to the final anneal temperature of 570° C. and held there for 2 hours. The amount of cube orientation in the texture of the thin strip varied in the various samples between 85 and 95%.

EXAMPLE NO. 2

The cold rolled 0.4 mm strip from the first example was pre-annealed at 230° C. for 18 hours. Following this it was subjected to the same final anneal as in the first example.

All samples exhibited over 95% cube texture.

EXAMPLE NO. 3

A pre-anneal treatment similar to that in example No. 2 was carried out, but such that the maximum temperature was 320° C.

Coarse grain was observed in the samples and the amount of cube texture was only between 30 and 40%.

EXAMPLE NO. 4

High purity aluminum containing 22 ppm Si, 20 ppm Fe, 37 ppm Cu and less than 10 ppm of other elements was cast into ingots using DC casting. After a 10 hour ingot heat treatment at 570° C., the ingots were cooled to 400° C., hot rolled to 10 mm and cooled in water from the finishing temperature of 355° C.

The material was then cold rolled to 0.145 mm without an intermediate anneal.

The final anneal was carried out as in the first example; the amount of cube orientation was, however, only 30–40%.

This is due to heating the ingot to too high a temperature.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for producing aluminum strip characterized by a high degree of cube texture comprising:
   casting at least 99.9% pure aluminum;
   rolling said cast aluminum at a temperature of no more than 250° C. without intermediate anneals from a thickness of at least eight times final thickness to final thickness; and
   final annealing said cold rolled strip at a temperature of between 480° to 640° C. so as to provide an aluminum strip characterized by at least 85% cube texture.

2. A process according to claim 1 including casting said 99.9% pure aluminum in a strip caster comprising moving caterpiller track type belts.

3. A process according to claim 1 including initially rolling said cast aluminum at a temperature of between 20° to 420° C. to an intermediate thickness of at least eight times the final thickness prior to cold rolling.

4. A process according to claim 1 including final annealing at a temperature of between 520° to 600° C. for from 0.5 to 12.0 hours.

5. A process according to claim 3 including final annealing at a temperature of between 520° to 600° C. for from 0.5 to 12.0 hours.

6. A process according to claim 1 including heating said rolled strip to final annealing temperature at a rate of less than 500° K./hour.

7. A process according to claim 3 including heating said rolled strip to final annealing temperature at a rate of less than 500° K./hour.

8. A process according to claim 4 including heating said rolled strip to final annealing temperature at a rate of less than 500° K./hour.

9. A process according to claim 5 including heating said rolled strip to final annealing temperature at a rate of less than 500° K./hour.

10. A process according to claim 1 including annealing said rolled strip at a temperature of between 120° to 300° C. for not more than 30 hours prior to final anneal.

11. A process according to claim 3 including annealing said rolled strip at a temperature of between 120° to 300° C. for not more than 30 hours prior to final anneal.

12. A process according to claim 4 including annealing said rolled strip at a temperature of between 120° to 300° C. for not more than 30 hours prior to final anneal.

13. A process according to claim 5 including annealing said rolled strip at a temperature of between 120° to 300° C. for not more than 30 hours prior to final anneal.

14. A process according to claim 6 including annealing said rolled strip at a temperature of between 120° to 300° C. for not more than 30 hours prior to final anneal.

15. A process according to claim 7 including annealing said rolled strip at a temperature of between 120° to 300° C. for not more than 30 hours prior to final anneal.

16. A process according to claim 8 including annealing said cold rolled strip at a temperature of between 120° to 300° C. for not more than 30 hours prior to final anneal.

17. A process according to claim 9 including annealing said rolled strip at a temperature of between 120° to 300° C. for not more than 30 hours prior to final anneal.

18. A process according to claim 1 including heat treating said cast aluminum at a temperature of not more than 430° C. for not more than 12 hours prior to rolling.

19. A process according to claim 3 including heat treating said cast aluminum at a temperature of not more than 430° C. for not more than 12 hours prior to rolling.

20. A process according to claim 10 including heat treating said cast aluminum at a temperature of not more than 430° C. for not more than 12 hours prior to rolling.

21. A process according to claim 1 wherein said aluminum is at least 99.98% pure.

22. An anode for electrolytic capacitors produced in accordance with the process of claim 1.

23. A process according to claim 1 including casting said at least 99.9% pure aluminum in a roll-type caster.

* * * * *

UNITED STATES PATENT AND TRADEMARK OFFICE
CERTIFICATE OF CORRECTION

PATENT NO. : 4,609,408

DATED : September 2, 1986

INVENTOR(S) : Pedro Rodrigues et al.

It is certified that error appears in the above-identified patent and that said Letters Patent is hereby corrected as shown below:

Column 4, claim 16, line 26, delete "cold".

Signed and Sealed this

Fourth Day of November, 1986

[SEAL]

Attest:

DONALD J. QUIGG

Attesting Officer

Commissioner of Patents and Trademarks